United States Patent [19]

Millsapps, Jr.

[11] 4,386,667
[45] Jun. 7, 1983

[54] PLUNGER LUBRICANT COMPENSATOR FOR AN EARTH BORING DRILL BIT

[75] Inventor: Stuart C. Millsapps, Jr., Houston, Tex.

[73] Assignee: Hughes Tool Company, Houston, Tex.

[21] Appl. No.: 145,549

[22] Filed: May 1, 1980

[51] Int. Cl.³ .............................................. E21B 10/22
[52] U.S. Cl. .................................. 175/228; 175/227; 175/371; 175/372; 277/95; 384/93
[58] Field of Search ............... 175/227, 228, 229, 107, 175/370, 371, 372, 337; 308/8.2; 277/95; 184/39

[56] References Cited

U.S. PATENT DOCUMENTS

| | | | |
|---|---|---|---|
| 2,150,529 | 3/1939 | Tremolada | 184/39 |
| 2,187,037 | 1/1940 | Kirkpatrick | 175/372 X |
| 2,912,999 | 11/1959 | Kersh | 137/512.4 |
| 3,075,781 | 1/1963 | Atkinson et al. | 277/95 X |
| 3,199,878 | 8/1965 | Cunningham et al. | 277/88 |
| 3,299,973 | 1/1967 | Swart et al. | 175/371 |
| 3,303,898 | 2/1967 | Bercaru | 175/228 |
| 3,370,895 | 2/1968 | Cason, Jr. | 308/8.2 |
| 3,476,195 | 11/1969 | Galle | 175/228 |
| 3,612,197 | 10/1971 | Motoyama | 175/372 X |
| 3,942,596 | 3/1976 | Millsapps, Jr. | 175/227 |

FOREIGN PATENT DOCUMENTS

| | | | |
|---|---|---|---|
| 2272254 | 12/1975 | France | 175/228 |

*Primary Examiner*—James A. Leppink
*Assistant Examiner*—Hoang C. Dang
*Attorney, Agent, or Firm*—Robert A. Felsman; James E. Bradley

[57] ABSTRACT

An earth boring drill bit has a lubricant pressure compensator that includes a plunger that moves slidingly in the reservoir to reduce pressure differential, and also allows lubricant to bleed past to relieve excess lubricant pressure. The plunger is carried slidingly in the reservoir. The plunger has a convex end in contact with the lubricant and a concave end in contact with the borehole fluid. The plunger has a rod that contacts a stop in the reservoir when the lubricant pressure is greater than the borehole pressure. Once stopped, the configuration of the plunger allows lubricant to bleed past the plunger to relieve excess lubricant pressure.

5 Claims, 4 Drawing Figures

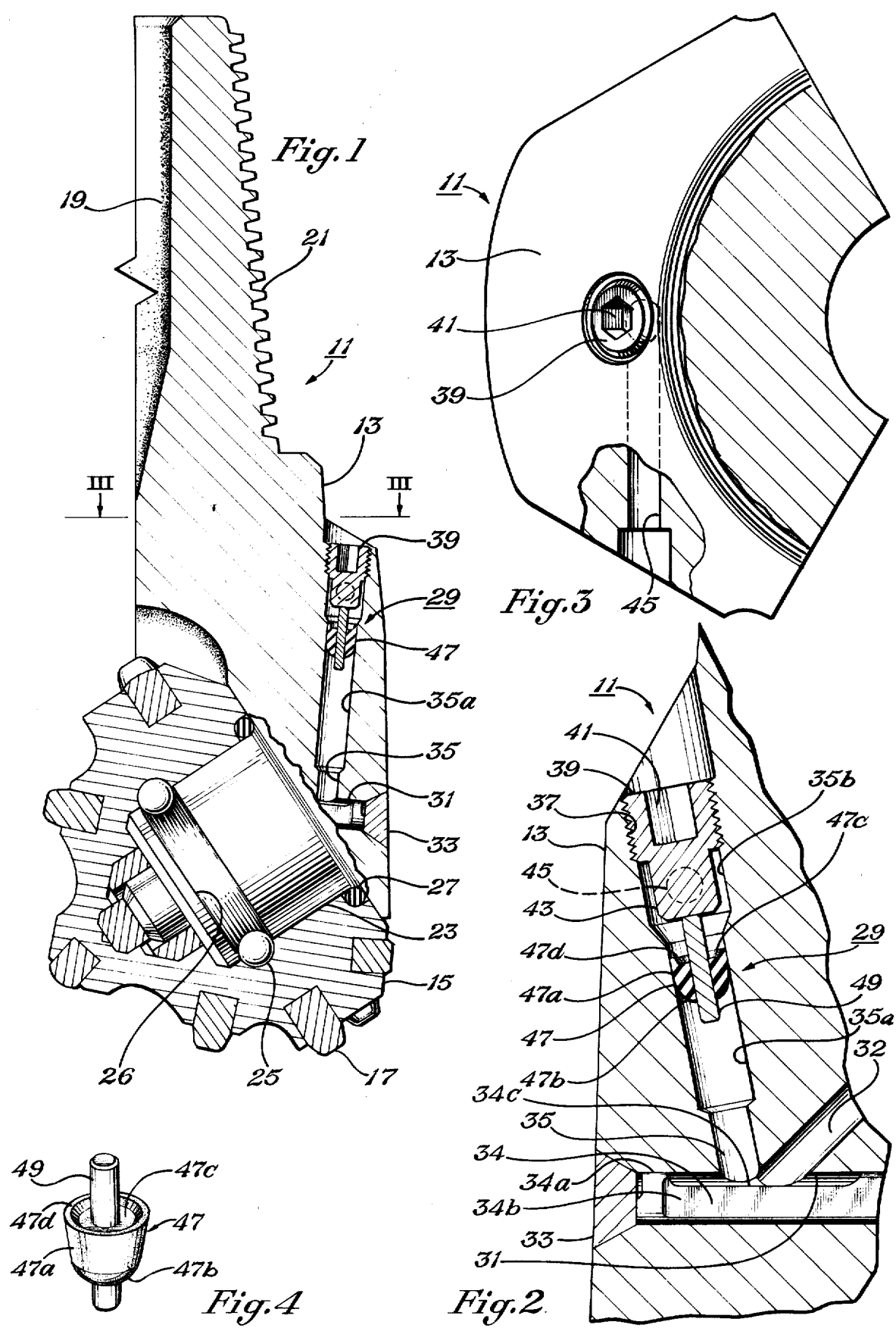

4,386,667

PLUNGER LUBRICANT COMPENSATOR FOR AN EARTH BORING DRILL BIT

BACKGROUND OF THE INVENTION

1. Field of the Invention

This invention relates in general to earth boring drill bits and in particular to an improved lubricant pressure compensator for reducing pressure differential across the cutter seals.

2. Description of the Prior Art

Earth boring drill bits commonly used in oil and gas wells utilize three conical cutters, each mounted on bearings on a depending head section. Lubricant is supplied to the bearings from a reservoir in each head section. A seal at the base of each cutter prevents borehole liquid and cuttings from entering the bearing areas. The seal performs better if there is little or no pressure differential between the lubricant and the borehole fluid.

Pressure compensators have been used in the past to minimize pressure differential across the seals, such as shown in my prior U.S. Pat. No. 4,055,225. The most common type uses a diaphragm that has one side in contact with lubricant and the other side in contact with borehole fluid. As the bit descends in the well, the diaphragm flexes toward the lubricant portion of the reservoir to increase the lubricant pressure in response to the increasing hydrostatic pressure of the borehole fluid.

The temperature in a well increases with depth. During rotation, friction may further increase the temperature of the bit. This temperature increase will cause the grease and trapped gasses in the bit to expand, resulting in a pressure increase in the lubricant reservoir. Movement of the diaphragm toward the borehole fluid will reduce the pressure buildup in the reservoir until the diaphragm reaches its maximum outward position. My prior U.S. Pat. No. 3,942,596 shows a pressure relief valve to be used in conjunction with the diaphragm compensator to allow lubricant to bleed out of the reservoir when the diaphragm is at its maximum position. Also, compensator configuration and positioning, such as shown in my prior U.S. patent application, Ser. No. 885,723, filed Mar. 13, 1978, U.S. Pat. No. 4,276,946, allows the lubricant portion of the reservoir to increase in volume over the original volume at the surface, to prevent excessive pressure increase in the lubricant due to temperature increase.

While the device shown in the above-identified patent application is successful, simplification of structure is desirable, since the diaphragm assembly has several components. Devices simpler in structure, such as sliding pistons, are shown in several patents, such as U.S. Pat. Nos. 3,199,878 and 3,365,247. None of the proposals for sliding pistons, however, have means incorporated with the piston for relieving excess lubricant pressure when the piston is at its maximum outward position.

SUMMARY OF THE INVENTION

It is a general object of this invention to provide an improved lubricant pressure compensator for an earth boring drill bit.

It is a further object of this invention to provide an improved lubricant pressure compensator for an earth boring drill bit that is simpler in construction than diaphragm compensators and has the ability to relieve excess lubricant pressure.

In accordance with these objects, an earth boring drill bit is provided with a lubricant reservoir that has a resilient plunger carried in it. The plunger is slidable in response to pressure differential between the lubricant and the borehole fluid. The plunger has pressure relief means for allowing lubricant to flow past it to the exterior should the lubricant pressure exceed the borehole fluid pressure by a selected amount.

Preferably, the pressure relief is accomplished by using a plunger with a lip seal configuration. The lubricant end is convex, while the borehole fluid end has a depression in it encircled by a lip. This configuration allows lubricant to flow past the plunger at a selected pressure differential, but prevents borehole fluid from flowing past in the other direction. The plunger has a rod that contacts a plug located at the end of the reservoir to stop movement of the plunger and allow lubricant to bleed-off.

BRIEF DESCRIPTION OF THE DRAWINGS

FIG. 1 is a partial vertical sectional view of an earth boring drill bit having a lubricant system constructed in accordance with this invention.

FIG. 2 is a partial enlarged vertical sectional view of the lubricant system of FIG. 1.

FIG. 3 is an enlarged partial sectional view of the drill bit of FIG. 1, taken along the line III—III of FIG. 1.

FIG. 4 is a perspective view of a plunger used with the lubricant system of FIG. 1.

DESCRIPTION OF THE PREFERRED EMBODIMENT

The numeral 11 in FIG. 1 of the drawings designates a lubricated, rotatable cutter-type earth boring drill bit having a body 13 formed in three sections, known as head sections. Each head section supports a rotatable cutter 15 having earth disintegrating teeth 17. The drill bit has an axial fluid passage 19 extending through the body with three exits in shroud areas (not shown) located between the cutters 15. Bit 11 has a threaded pin member 21 for securing to drill pipe.

Each cutter 15 is mounted on a bearing 23 formed on a depending pin from each head section. A plurality of balls 25 located in a ball race 26 retain the cutter 15 on the bearing 23. An O-ring seal 27 at the base of each cutter 15 seals the bearing 23 area from borehole fluid and cuttings. A pressure compensator system, indicated generally as numeral 29, provides lubricant to the bearing 23 area and limits the pressure differential across seal 27.

Referring to FIG. 2, the pressure compensator system 29 includes a lubricant reservoir. The lubricant reservoir includes a ball passage 31 that leads to the balls 25, and thus is in communication with the bearing 23 area. Another passage 32 leads from ball passage 31 to a flat (not shown) on bearing 23. Ball passage 31 provides access for inserting the balls 25 into ball race 26 after the cutter 15 has been assembled on the bearing 23.

The balls 25 are prevented from re-entering ball passage 31 by a ball plug 34. Ball plug 34 has a cylindrical head 34a equal to the diameter of ball passage 31. Ball plug 34 has a flat rectangular body 34b that extends to the ball race 26. Body 34b is thinner than the diameter of ball passage 31 for allowing the passage of lubricant to the bearing 23 area and ball race 26. A recess 34c is formed in the top of body 34b to avoid blockage of the lubricant passage 32. After installation, the head 34a of ball plug 34 is welded to bit body 13 as indicated by the weld metal 33.

The lubricant reservoir also includes a passage 35 extending upwardly from ball passage 31 next to passage 32 and above the ball plug recess 34c. Passage 35 has a cylindrical plunger section 35a and an enlarged diameter section 35b located above the plunger section 35a. A cylindrical section 35, smaller in diameter than plunger section 35a, connects plunger section 35a to ball passage 31. The plunger section 35a is coaxial with the enlarged section 35b, which has a larger diameter than the plunger section 35a. The top of the enlarged section 35b contains threads 37 and leads to the exterior of the bit body 13.

A solid plug 39 has a threaded section for securing in threads 37, and a polygonal cavity 41 in its top for receiving a tool for tightening. Plug 39 has a depending cylindrical portion 43 that is axially aligned with the passage sections 35a and 35b, but of lesser diameter than the enlarged section 35b. The lower end of the depending portion 43 is located near the lower end of the enlarged section 35b. Referring also to FIG. 3, a vent hole or passage 45 extends transversely from the enlarged section 35b and leads to the exterior of the bit body 13.

Referring to FIGS. 2 and 4, a resilient plunger 47 is slidingly carried in the plunger section 35a. Plunger 47 divides the reservoir into a lubricant chamber and a borehole fluid section. The lubricant chamber includes spaces in bearing 23, ball passage 31 and the part of plunger section 35a on the inward or lubricant end of plunger 47. The borehole fluid section is the part of the plunger section 35b located on the outer or borehole fluid end of plunger 47. The volume of the lubricant chamber changes in proportion to the sliding movement of plunger 47.

The upper end of plunger 47 is in the general configuration of a lip seal. It has frusto-conical sidewalls 47a that slidingly contact the cylindrical walls of plunger section 35a. The plunger sidewalls 47a taper inwardly toward the lubricant chamber of the reservoir at an angle of 6½ degrees. The frusto-conical sidewalls 47a join a convex end 47b that is in the lubricant chamber of reservoir passage 35a, giving the plunger 47 a generally conical configuration. Convex end 47b is preferably a segment of a sphere, however, "convex" is used broadly herein to include any surface that bulges outward. The borehole fluid end of plunger 47 has a depression 47c that defines a circular lip 47d. The conical sidewalls 47a terminate at the lip 47d. This results in a generally concave end adapted to be in contact with borehole fluid, with "concave" being used broadly to include all types of depressions, not just inside portions of spheres.

Plunger 47 is molded on an axial rod or stem 49 preferably of metal. Rod 49 protrudes from the convex end 47b a short distance, and protrudes from the depression 47c a greater distance. The upper end of rod 49 is adapted to contact the depending portion 43 of plug 39 when the plunger 47 is in its uppermost position, as shown in FIG. 2. Depending portion 43 serves as stop means for contacting rod 49 to limit the amount of movement of the plunger 47 toward enlarged section 35b.

In the preferred embodiment, plunger 47 is constructed of a rubber-like material such as Buna-N material, and is of 70 Durometer hardness. In one configuration, the diameter of plunger 47 at lip 47d is preferably 0.352 inch, while the inner diameter of the lip is 0.290 inch, making the width of the lip substantially less than the diameter. The diameter of plunger section 35a is 0.3125 inch, causing the plunger 47 to deform when placed in the plunger section. The depression 47c has a flat base, and sidewalls that are tapered at a 35 degree angle with respect to vertical. The depth of the depression is 0.047 inch. The length of the plunger 47 from the tip of the convex end 47b to the edge of the lip 47d is 0.371 inch, thus the height of the lip is substantially less than the total length of the plunger.

The bit is assembled as shown in FIG. 1 and filled with lubricant at the surface. In the lubricating operation, first the drill bit 11 is assembled with the cutters 15 on the bearings 23 and retained by balls 25. Ball plug 34 is then welded in place. A plug (not shown) will be placed in the entrance of the vent hole 45, which is preferably threaded (not shown). Then, before the plunger 47 is placed in the reservoir, a nozzle (not shown) is secured in the threads 37. The nozzle is connected to a vacuum pump, which evacuates substantially all the air and gasses in the reservoir and bearing 23 areas. While retaining the vacuum, degassed lubricant is then introduced through the nozzle and pumped into the reservoir to a pressure of approximately 275 psi (pounds per square inch) to assure complete filling. Then the plug is removed from the entrance of the vent hole 45 and the nozzle of the vacuum pump is removed from the thread 37 of the reservoir passage 35. The plunger 47 is then pushed into the reservoir plunger section 35a until the top of rod 49 is about at the point where the lower end of depending portion 43 will be. As it is pushed into the plunger section 35a, some lubricant will be expelled through the vent hole 45. Then the plug 39 is secured in the threads 37 and the bit is ready for operation. The entrance to the vent passage 45 will remain open.

In operation, the drill bit 11 will be secured to the lower end of a string of drill pipe and lowered into the well. As the bit descends, borehole liquid will enter the vent hole 45, flow around the plug depending portion 43 and come into contact with the depression 47c of the plunger. As the hydrostatic pressure in the borehole increases, this pressure will act on the plunger 47. Once the difference in pressure overcomes the frictional resistance of the plunger 47 in the reservoir section 35a, it causes the plunger to slide downwardly toward the ball passage 31. The downward movement of the plunger will thereby transmit the borehole pressure to the lubricant in the lubricant chamber. Downward movement of the plunger 47 will stop when the lubricant pressure plus the pressure required to move the plunger 47 due to friction equals the hydrostatic pressure.

When on the bottom of the borehole, the bit will be rotated clockwise, causing cutters 15 to rotate on bearings 23, with the teeth 17 disintegrating the earth. Temperature rise due to the higher temperatures at the bottom of the hole than at the surface and due to the friction caused by the rotation, will cause the lubricant pressure to increase. This expansion may push the plunger 47 upward. If the pressure is sufficiently greater below plunger 47 than above, then plunger 47 may move sufficiently high so that rod 49 contacts the depending plug portion 43. If the internal lubricant pressure is sufficiently high, the configuration of the plunger 47 will allow lubricant to flow past it and out the vent hole 45. The convex end 47b and conical sidewalls 47a allow the lubricant to press radially inward against the lip 47d, and the depression 47c allows the lip 47d to deform inwardly for serving as pressure relief means. When a sufficient amount of lubricant has been bled-off, the pressure differential across the cutter seal 27 will again proceed to a preferred range. Preferably, the plunger 47 will allow bleed-off at a minimum differential when the lubricant pressure is 90 to 110 psi greater than the pressure in the vent hole 45.

Plunger 47 allows fluid to pass only in one direction. If the borehole fluid pressure exceeds the lubricant pressure, and if plunger 47 has reached the base of the plunger section 35a, further increase in borehole fluid pressure only causes lip 47d to deform radially outward, preventing leakage up to a high pressure differential.

The invention has significant advantages. The plunger is simpler in construction and requires less space than prior art diaphragms. This allows the plunger compensator to be used in rock bits of very small size. It compensates for pressure differential and relieves excess lubricant pressure.

While the invention has been shown in only one of its forms, it should be apparent to those skilled in the art that it is not so limited but is susceptible to various changes and modifications without departing from the spirit thereof.

I claim:

1. In an earth boring drill bit of the type having a plurality of rotatable cutters mounted on bearings on depending head sections, an improved means for supplying lubricant to the bearings, comprising:
   a lubricant reservoir having a plunger section with a cylindrical wall surface;
   a vent hole leading from the reservoir to the exterior of the bit for admitting borehole fluid to the reservoir; and
   a resilient plunger carried in the plunger section with a lubricant end in contact with the lubricant and a borehole fluid end adapted to be in contact with the borehole fluid, the plunger engaging the wall surface of the plunger section and being freely and axially slidable in the plunger section to equalize pressure differential across the plunger;
   stop means located in the reservoir for stopping movement of the plunger toward the vent hole at a selected point in the plunger section;
   the plunger having pressure relief means that causes deformation of the plunger for allowing leakage of lubricant to the exterior when the plunger is stopped by the stop means and when the lubricant pressure exceeds the borehole fluid pressure by a selected amount.

2. In an earth boring drill bit of the type having a plurality of rotatable cutters mounted on bearings on depending head sections, an improved means for supplying lubricant to the bearings, comprising:
   a lubricant reservoir in each head section;
   a vent hole extending from the reservoir to the exterior of the bit for admitting borehole fluid to the reservoir;
   a resilient plunger carried in the reservoir, the plunger having a generally convex lubricant end in contact with the lubricant in the reservoir and a borehole fluid end adapted to be in contact with borehole fluid entering through the vent hole into the reservoir, the plunger being slidable in the reservoir to vary the volume of the reservoir on the lubricant end of the plunger in response to pressure differential with the borehole fluid, the borehole fluid end of the plunger having a depression that defines a lip around the periphery, the plunger having an axial rod that extends outwardly from the borehole fluid side; and
   stop means located in the reservoir for contacting the rod to limit the amount of movement of the plunger toward the vent hole when the lubricant pressure exceeds the borehole pressure, the configuration of the plunger then allowing lubricant to flow past the plunger to the vent hole to relieve lubricant pressure should the pressure differential exceed a selected minimum.

3. In an earth boring drill bit of the type having a plurality of rotatable cutters mounted on bearings on depending head sections, an improved means for supplying lubricant to the bearings, comprising:
   a lubricant reservoir in each head section with an entrance to the exterior of the bit;
   a plug located in the entrance;
   a vent hole extending from the reservoir adjacent the plug to the exterior of the bit for admitting borehole fluid to the reservoir; and
   a resilient plunger carried in the reservoir, the plunger having a generally convex end in contact with lubricant in the reservoir and a generally concave borehole fluid end adapted to be in contact with borehole fluid in the reservoir, the plunger being slidable in the reservoir to vary the volume of the reservoir on the lubricant end of the plunger in response to pressure differential with the borehole fluid, the plunger having an axial rod that extends outwardly from the borehole fluid end, the rod adapted to contact the plug to limit the amount of movement of the plunger toward the vent hole when the lubricant pressure exceeds the borehole fluid pressure, the configuration of the plunger then allowing lubricant to flow past the plunger to the vent hole to relieve lubricant pressure should the pressure differential exceed a selected minimum.

4. In an earth boring drill bit of the type having a plurality of rotatable cutters mounted on bearings on depending head sections, an improved means for supplying lubricant to the bearings, comprising:
   a lubricant reservoir in each head section with an entrance to the exterior of the bit;
   a plug secured in the entrance, the plug having a depending portion of diameter less than the reservoir at the entrance;
   a vent hole extending transversely from the reservoir adjacent the depending portion of the plug; and
   a resilient plunger carried in the reservoir, dividing the reservoir into a lubricant chamber and a borehole fluid section, the plunger being slidable for varying the volume of the lubricant chamber in response to pressure differential acting on the plunger, the plunger having an axial rod protruding into the borehole fluid section that is adapted to contact the depending portion of the plug to limit the amount of movement of the plunger toward the vent hole, the plunger having a lip seal configuration for allowing lubricant to flow past the plunger when the rod is in contact with the depending portion of the plug, and the pressure in the lubricant chamber has exceeded the pressure in the borehole fluid section by a selected amount.

5. In an earth boring drill bit of the type having a plurality of rotatable cutters mounted on bearings on depending head sections, an improved means for supplying lubricant to the bearings, comprising:
- a lubricant reservoir in each head section with an entrance to the exterior of the bit;
- a plug secured in the entrance, the plug having a depending portion of diameter less than the reservoir at the entrance;
- a vent hole extending transversely from the reservoir adjacent the depending portion of the plug; and
- a resilient plunger slidingly carried in the reservoir, separating the reservoir into a lubricant chamber and a borehole fluid section, the plunger having an axial rod protruding into the borehole fluid section that is adapted to contact the depending portion of the plug when the plunger is moving toward the vent hole, the plunger having generally conical sidewalls, a convex lubricant end in the lubricant chamber, and a borehole fluid end that has a depression encircled by a lip, to allow lubricant to deform the lip and flow past the plunger when the rod is in contact with the depending portion of the plug, and when the pressure in the lubricant chamber exceeds the pressure in the borehole fluid section by a selected minimum.

* * * * *